O. W. Minard,
Making Sheet-Metal Vessels.
Nº 15,247.  Patented July 1, 1856.
Fig: 1
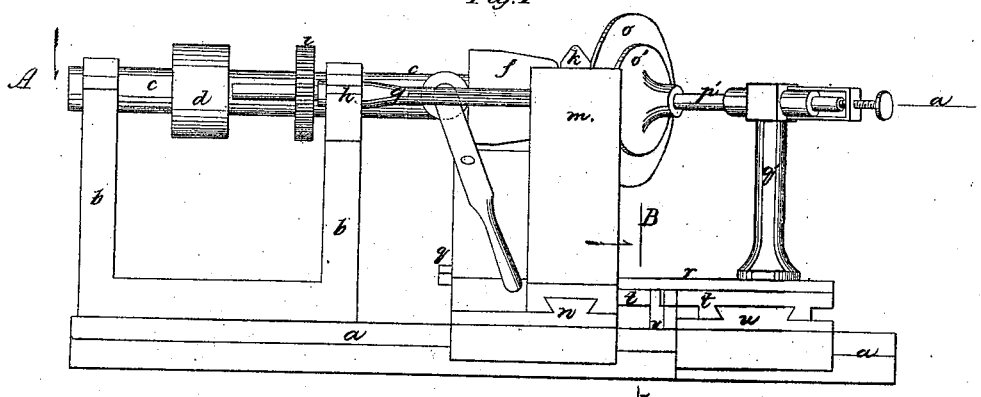
Fig 2. A. ω.
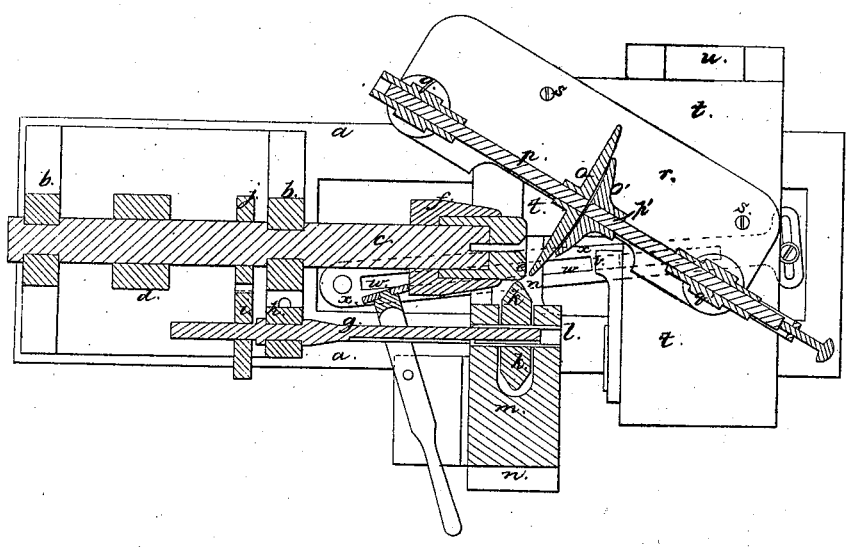
Fig 3. B. z.
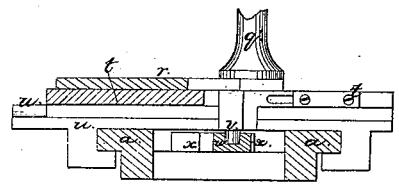
Witnesses:  
Geo O Ellis  
William McYale
Inventor:  
O. W. Minard

UNITED STATES PATENT OFFICE.

O. W. MINARD, OF WATERBURY, CONNECTICUT.

IMPROVED BRASS-KETTLE MACHINE.

Specification forming part of Letters Patent No. 15,247, dated July 1, 1856.

*To all whom it may concern:*

Be it known that I, O. W. MINARD, of Waterbury, in the State of Connecticut, have invented certain new and useful Improvements in the Machinery for Forming Brass Kettles, of which the following is a full, clear, and exact description, reference being had to the accompanying drawings, making part of this specification, in which—

Figure 1 is an elevation of the machinery; Fig. 2, a horizontal section taken at the line A *a* of Fig. 1; and Fig. 3 a cross vertical section taken at the line B *b* of Fig. 1.

The same letters indicate like parts in all the figures.

My said invention relates to improvements in machinery for forming kettles of sheet-brass by what is known as the "spinning operation"—that is, by gripping a disk of sheet-brass between two clamps on a mandrel and rolling it, as the mandrel turns, between two rolling surfaces which elongate the metal radially and contract it in the direction of the circumference, thus gradually bringing it to the form required.

In the machine secured to me by Letters Patent bearing date the 15th day of April, 1856, the disk of metal is rolled between a forming-roller on a mandrel and a working-roller on an arbor or shaft parallel with the mandrel, the surface of the forming-roller and the working-roller being made to rotate by suitable gearing, so that their surfaces shall move with equal velocities in opposite directions; and as the rolling or spinning action takes place on the disk of metal the arbor which carries the clamps that hold the said disk is placed at a given angle to the axis of the forming-roller, and the carriage on which the said arbor is mounted moves from the forming and working rollers in a line parallel with the mandrel; and although the said machine so organized and operated is useful, and is a decided improvement on the machinery previously used for the purpose of making brass kettles and other analogous work, I have nevertheless made decided improvements on it.

The first part of my present invention relates to an improvement on the mode of operation of the forming and working rollers, whereby I am enabled at the same operation to burnish either the inner or the outer surface of the kettle or other hollow article produced thereby; and the nature of this part of my invention consists in causing one of the said rolling surfaces to have a slipping action on the surface of the disk of metal, the effect of which slipping action is to burnish or polish the metal surface acted upon; and the second part of my invention consists in giving to the carriage which carries the arbor and clamps that hold the disk of metal to be worked between the forming and working rollers a motion from the said working and forming rollers in a line diagonal to the line of the axis of the forming-roller, to keep the disk of metal during the operation always in contact with the surface of the forming-roller. I have discovered that at whatever angle the arbor of the clamps may be placed to the line of the axis of the forming-roller the action of the rollers will not gather up or contract the metal disk in the direction of the circumference to an extent quite equal to the determined angle, and that in consequence the surface of the metal disk under operation tends to recede from the surface of the forming-roller and can only be kept thereto by the pressure of the working-roller. This tendency to leave the surface of the working-roller results in an imperfect surface on the work produced; but by causing the carriage to move in a line diagonal to the line of the axis of the forming-roller any desired degree of inclination can be given to this movement to insure the contact of the surface of the disk with the surface of the forming-roller to avoid the defective action referred to.

In the accompanying drawings, *a a* represent the ways on which are mounted the two puppets, *b b*, provided with suitable boxes, in which the mandrel *c* is mounted. This mandrel is provided with a pulley, *d*, in the manner of a lathe, to receive a belt from some first mover. To the forward end of this mandrel is fitted the forming-roller *e*, which is cylindrical and rounded at the forward end. Its outer diameter is greater than that of the mandrel, and its inner diameter is made to fit onto the end of the mandrel accurately, but so as to turn thereon. A screw passes through a central hole in the end of the roller, and is tapped into the end of the mandrel, so as to control the forming-roller and set it to turn on the mandrel with more or less freedom determined by the grip of the screw or any equivalent which may be substituted therefor.

On the mandrel and extending over a part of the length of the forming-roller is fitted a beveled sleeve, $f$, to sustain that part of the disk which is beyond the working-roller; but this makes no part of my present invention, and will be found fully described in the Letters Patent before recited.

In front of and parallel with the mandrel is an arbor, $g$, mounted in an adjustable box, $h$, connected with one of the puppets $b$. This arbor carries a spur-wheel, $i$, which engages a corresponding spur-wheel, $j$, on the mandrel, so that the rotation of the mandrel will rotate the said arbor in the reverse direction, the relative velocities depending on the relative diameters of the two spur-wheels.

In front of the forming-roller there is a working-roller, $k$, the periphery of which is rounded or beveled, as represented in the drawings, or of any other suitable form. This roller has a hollow shaft, $l$, mounted in an adjustable head, $m$, fitted to slide for adjustment toward and from the mandrel on a carriage, $n$, that slides longitudinally on the ways $a\ a$, and the hollow shaft $l$ is feathered to and slides on the arbor $g$, so as to turn therewith. By reason of this construction of the parts the working-roller $k$ can be adjusted to work on any desired thickness of metal interposed between it and the forming-roller, and to work on any desired part of the length of the forming-roller. The two clamps $o\ o'$ are mounted on arbors $p\ p'$ in puppets $q\ q'$ on a plate, $r$, which can be secured by screws $s\ s$ or any other suitable means on the top of a carriage, $t$, and at any desired angle with the line of the axis of the mandrel; and this carriage $t$ is fitted to slide on a bed-carriage, $u$, which in turn slides longitudinally on the ways $a\ a$, the carriage $t$ sliding on the carriage $u$ at right angles to the ways $a\ a$. A pin, $v$, projects from the edge of the carriage $t$, and is fitted to slide in a groove, $w$, of a diagonal bar, $x$, placed between the ways $a\ a$, with one end pivoted and the other adjustable, so that it can be placed at any desired angle with the line of axis of the mandrel. A disk of brass being suitably clamped between the clamps $o\ o'$, the arbors of the said clamps are adjusted at any desired angle with the axis of the mandrel, and the clamp $o$ brought as near as practicable to the end of the forming-roller, and the working-roller adjusted so as to work on the outer surface of the disk and to grip the disk against the surface of the forming-roller. The mandrel is then set in motion, which causes the forming and the working rollers to rotate in opposite directions, and by the impingement to cause the disk, with its clamps, to rotate also; and as this spinning motion progresses, the bed-carriage is drawn by hand or other suitable means from the forming-roller, in consequence of which the disk of metal is gradually acted upon from the clamps to the periphery in the line of a volute, which has the effect to contract the metal in the direction of the circumference and to elongate it radially. As the bed-carriage moves longitudinally from the mandrel in the line of the axis, the pin $v$ of the upper carriage sliding in the groove of the diagonal bar $x$, the clamps move back from the axis of the forming-roller, and thus keep the inner surface of the disk of metal firmly in contact with the surface of the forming-roller, notwithstanding the spinning action of the rollers fails to contract the metal to the extent of the angle determined by the angle of the axis of the clamps to the axis of the forming-roller.

The diameter of the forming and of the working rollers is not in the proportions of the spur-wheels $i$ and $j$; but the forming-roller is relatively greater, in consequence of which the surface of the forming-roller will travel faster than the surface of the working-roller, and as motion is imparted to the metal disk by the bite of the two rollers, it follows that the metal disk must slide on one or the other, and it will slip on the one which is the most polished; hence, by making the forming-roller with the smoothest surface, the inside of the kettle will be burnished, and by making the surface of the working-roller the smoothest, the outside of the kettle will be burnished; but by loosening the screw which secures the forming-roller onto the mandrel, so that it will turn freely on the mandrel, then the forming-roller will be carried by the impingement of the rolling surfaces, and both surfaces of the kettle will be equally well finished. In this way the relative degree of finish of the inside and outside can be regulated at pleasure.

I do not wish to be understood as limiting my claim of invention to the special mode of producing the polish on the surface of the metal disk, so long as that result is obtained by the slipping of the surfaces in the rolling action; nor do I wish to limit my claim of invention to the mode of giving the diagonal motion to the carriage which carries the disk of metal, as the same motion may be imparted by equivalent mechanical devices.

What I do claim as my invention, and desire to secure by Letters Patent, is—

1. The method, substantially as specified, of polishing or burnishing either of the surfaces of the metal during and by the rolling action, by causing one of the rolling surfaces to move faster or slower than the other to produce a slip, as set forth.

2. In combination with the forming and working rollers, giving to the carriage which carries the clamps with the disk of metal a diagonal movement, substantially as described, to keep the inner surface of the metal in contact with the forming-roller during the rolling action, as described.

O. W. MINARD.

Witnesses:
 GEO. O. ELLIS,
 WILLIAM M. YALE.